United States Patent [19]

Decker et al.

[11] Patent Number: 5,011,721
[45] Date of Patent: Apr. 30, 1991

[54] CHEMORHEOLOGICALLY TAILORED MATRIX RESIN FORMULATIONS AND THEIR USE IN MAKING PRE-IMPREGNATED FIBERS AND IN FABRICATING COMPOSITE PARTS

[75] Inventors: Owen H. Decker, Okesa, Okla.; Neal A. Mumford, Brigham, Utah

[73] Assignee: Thiokol Corporation, Ogden, Utah

[21] Appl. No.: 422,989

[22] Filed: Oct. 16, 1989

[51] Int. Cl.$^5$ ............................. C08J 5/24; C08L 63/00
[52] U.S. Cl. ..................................... 428/36.9; 428/273; 428/290; 528/91; 528/103; 528/361; 528/407
[58] Field of Search ................. 528/91, 103, 361, 407; 428/273, 290, 36.9; 156/169

[56] References Cited

U.S. PATENT DOCUMENTS

| | | | |
|---|---|---|---|
| 3,403,199 | 9/1968 | Ramos | 528/103 |
| 3,488,404 | 1/1970 | Parker | 528/103 X |
| 3,983,289 | 9/1976 | Nishizaki et al. | 528/91 X |
| 4,088,633 | 5/1978 | Gurney | 528/103 X |
| 4,117,361 | 9/1978 | Smith et al. | 528/103 X |
| 4,447,586 | 5/1984 | Shimp | 528/91 X |
| 4,775,736 | 10/1988 | Wiggins | 528/91 |

Primary Examiner—Earl Nielsen
Attorney, Agent, or Firm—Parmelee, Bollinger & Bramblett

[57] ABSTRACT

Chemorheologically viscosity tailored matrix resin formulation for use in forming prepregs and filament wound composite articles and having a specified viscosity profile comprising a curable matrix resin and an effective amount of a reactive resin curing agent reactive at room temperature and a latent resin curing agent substantially non-reactive at room temperature but activated upon heating or radiation such that the matrix resin formulation is adapted upon formulation to have a viscosity sufficiently low enough to enable the matrix resin to impregnate a filament or fiber at room temperature without the necessity for the application of heat or solvent and which, upon standing at room temperature after impregnation into the fiber or filament to form a prepreg composition, rises in viscosity to a viscosity level sufficiently high to prevent substantially any bleed of the matrix resin from winding tension upon spooling of the prepreg yet of sufficiently low enough viscosity to allow the prepreg to tack and drape in order to nestle and set during winding of a filament wound composite article from said prepreg after room temperature storage of the spooled prepreg material, and which matrix resin in the prepreg experiences a reduction in viscosity upon heating the prepreg composition, to a viscosity minimum sufficient low to allow the matrix resin in the heated prepreg to flow and substantially eliminate formation of voids in the winding of a composite article from said prepreg yet not so low as to permit excessive bleeding of the matrix resin from the prepreg and with the continued application of heat to the filament wound composite article to permit the matrix resin in the filament wound composite article to cure to a hardened or gelled state.

36 Claims, 3 Drawing Sheets

CHEMORHEOLOGICALLY TAILORED MATRIX RESIN FORMULATIONS AND THEIR USE IN MAKING PRE-IMPREGNATED FIBERS AND IN FABRICATING COMPOSITE PARTS

FIELD OF THE INVENTION

This invention relates to matrix resins formulations and pre-impregnated fibers and composite articles formed from said matrix resins formulations and pre-impregnated fibers wherein the matrix resin formulations are chemorheologically tailored, especially in regards to viscosity thereof, for providing curable pre-impregnated fiber compositions with long-working-lives, and to methods for producing and using said chemorheologically tailored resin and pre-impregnated fiber formulations to form composite articles.

BACKGROUND OF THE INVENTION

Solid propellant rocket motor cases for missile systems, spacecraft boosters and other types of large and small high performance, lightweight pressure vessels are commonly made from fiber reinforcement and various formulations of polyepoxide resins (epoxy resins) by a filament winding process. Similarly, filament winding with both polyesters and epoxy resins has made possible production of lightweight tanks, poles, piping and the like. Historically, fiberglass has been the most common reinforcement fiber, but other fibers such as carbon filaments, boron filaments, and high modulus organic polymer filaments, most significantly aramid filaments, have become increasingly useful in these composite structures to take advantage of their differing and sometimes unique physical properties.

The resins utilized are typically epoxy formulations based on diglycidyl ether-bisphenol A (DGEBA), reactive low molecular weight epoxy diluents and curing agents such as aliphatic and aromatic amines and carboxylic acid anhydrides. Both flexibilized and rigid epoxy resins have been used as matrix resins for filament wound composite structures.

In providing composite articles, such as the aforesaid pressure vessels, one has employed either a wet winding process or a prepreg process. The resin-fiber combination is to be employed in wet winding, the fiber is simply run through a resin bath containing the resin composition whereby the fiber is coated with the composition. The resulting resin-fiber combination is then wound directly into the desired structure, which is then cured by polymerization by means of heat or radiation. On the other hand, if a prepreg is to be used, the fiber or "tape" is impregnated with a curable resin composition and then wound on a spool as a prepreg and stored for winding at a future time. When the prepreg is converted into a composite article, the prepreg is then typically cured by polymerization by means of heat or radiation.

The present invention relates to matrix resin formulation especially suitable for and useful as prepreg compositions. A prepreg is composed of a reinforcing fiber and a curable resin matrix and is generally in one of the forms referred to as tow, roving, tape, mats, fabric and the like. In the past, preparation and use of prepreg materials has been time consuming and expensive, especially for long-working-life prepreg. By long-working-life prepreg is meant a prepreg whose handling properties do not change significantly over thirty days in normal room handling conditions.

In order to obtain and use such long-working-life prepreg, constraints at four stages in the processing sequence must be taken into consideration, namely, at the following stages: impregnation and spooling, filament winding or lay-up, cure minimum and ultimate cure of the composite article.

During impregnation the resin formulation must have a viscosity low enough so that it will penetrate fiber bundles containing many thousands of filaments, thoroughly and evenly wetting the individual filaments. Viscosities are typically under 5,000 centipoise (cps). Spooling requires high enough viscosity so that the resin does not squeeze out as the fiber is spooled. A nominal spooling viscosity for graphite fibers is generally about 1,000 cps.

Two constraints operate on resin viscosity during filament winding or lay-up. The resin must have low enough viscosity so that the prepreg conforms to the surface, minimizing interlaminar voids. Resin viscosity must be high enough, however, that minimum viscosity during cure does not go below about 500 cps. While these constraints leave a broad range for acceptable viscosities, the cure minimum of 500 cps precludes the use of heat-cured resins whose room temperature viscosity is 5,000 cps or less. A resin with a room temperature viscosity of 5,000 cps would fall far below 500 cps during heated cure. In consequence, viscosity must rise between spooling and use.

Techniques used to cure a matrix material often temporarily reduce its viscosity. Heated cure of typical epoxy prepreg resins can reduce their viscosity by several orders of magnitude for an hour. If viscosity falls too low, matrix material bleeds from a curing part, compromising its quality. While it is important that the matrix viscosity not fall too low during cure, it is also typically important that it becomes liquid. Failure of the matrix material to melt can be the source of void and delamination defects in composite parts.

After the cure minimum, the chemical reactions involved in curing a matrix resin progress, progressively raising the viscosity to gellation or to the level required for use of the composite part.

Heretofore, two techniques or processes have been employed to prepare long-working-life prepregs, namely, solution dilution impregnation and hot-melt impregnation. In solution impregnation a matrix resin with a viscosity of greater than 5,000 cps is diluted with a solvent to a viscosity of less than 5,000 cps. The fiber is impregnated with this diluted resin, then solvent is removed by heating and evaporation before the prepreg is spooled. Problems with this approach include the ecological requirement that the solvent be recovered, the associated expense and the inevitable residual solvent in the matrix resin. In hot-melt impregnation a matrix resin with a room temperature viscosity greater than 5,000 cps is heated to a temperature where its viscosity is less than 5,000 cps. Fiber is impregnated with the matrix resin at that temperature, the prepreg is cooled, then spooled. Problems with this approach include the need for matrix heating equipment, and rising viscosity of the matrix resin due to heat-induced polymerization during impregnation. Moreover, after the resin-fiber prepreg has been spooled, in each of these processes, the prepreg must generally be stored under refrigerated conditions to prevent the prepreg from going to ultimate cure which would prevent its use in winding or forming composite articles.

It would therefore be most desirable if a matrix material or resin formulation could be provided that would go through the aforedescribed desired viscosity profile at room temperature and do so without requiring solvent dilution or hot-melt impregnation of fibers. It would also be desirable for one to be able to spool the prepreg at room temperature substantially immediately after impregnation of the fiber and without requiring either solvent removal or cooling of the prepreg. It is also desirable that, after impregnation, the viscosity of the matrix rises and then levels off at a viscosity level planned for room temperature storage and later use of the prepreg thereby allowing for a long term room temperature storage of the prepreg and also for a long-working-life. It is still further desired that the prepreg, when the prepreg is used to form a composite article, goes to a viscosity minimum and then gels, cures or hardens like a typical prepreg. Also, it is desirable that the matrix processing viscosity be controlled by chemical formulation rather than by solvents or heated impregnation equipment.

BRIEF DESCRIPTION OF THE DRAWINGS

The invention and the background thereto will be understood by reference to the following drawings in which.

SUMMARY OF THE INVENTION

In accordance with the present invention, the matrix material or resin is chemorheologically tailored by matching the handling characteristics of the matrix material at room or normal handling temperature with the preparation operation being performed at that time, that is, the matrix material and prepreg formed therefrom is formulated to go through the required viscosity profile at room temperature. The matrix material or resin formulation at mix and during impregnation will have a viscosity of below about 5,000 cps, preferably about 500 to 1,000 cps, at room temperature. The matrix resin formulation is used at this viscosity to impregnate a fiber or "tape" to form a prepreg composition which is substantially immediately spooled in the same operation at essentially the same viscosity. After impregnation, the viscosity of the matrix resin rises to the level desired for the prepreg composition, that is, to above about 50,000 cps, and levels off at the desired prepreg viscosity thereby permitting long room temperature storage and long-working-life for the prepreg composition. Subsequently, the prepreg may be subjected to heating or radiation for forming a composite article therefrom. Upon the application of heat, the matrix material in the prepreg composition proceeds to a viscosity minimum in the range of from about 500 to about 30,000 cps and then gels or sets like a typical prepreg formed composite article. According to this invention, the matrix material processing viscosity is controlled by chemical formulation, i.e. chemorheologically tailoring, rather than by the use of solvents or heated impregnation equipment.

Figure 4:
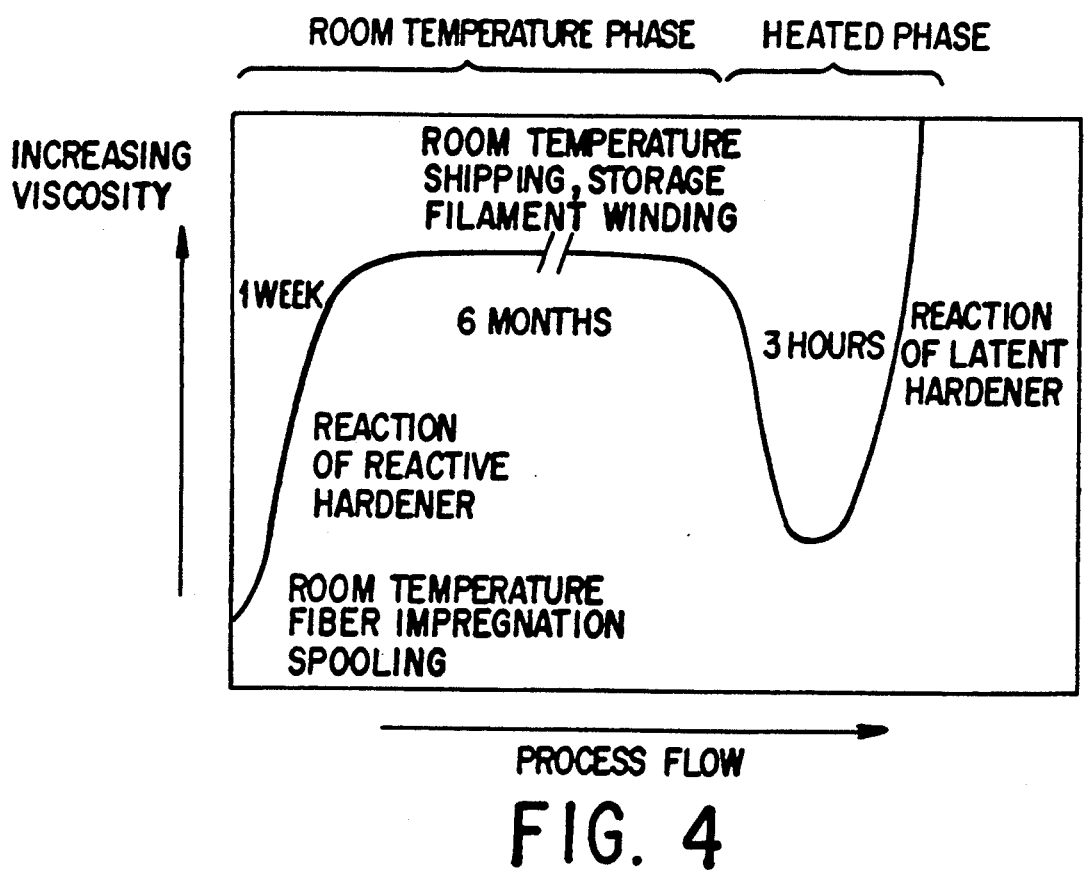
FIG. 4 is a typical viscosity profile of a chemorheologically tailored matrix resin during prepreg formation, storage and subsequent use to form a composite article following long term storage of the prepreg.

According to this invention, a combination of matrix resin ingredients is employed to provide a formulation of a viscosity at room temperature of less than about 5,000 cps and said formulation contains both a reactive hardener or curing agent and a latent hardener or curing agent. The reactive hardener curing agent is one which is reactive (either alone or in the presence of a catalyst) at room temperature and raises the viscosity of the matrix resin formulation when impregnated in a fiber to a viscosity at least about 50,000 cps and generally to within the range of from about 50,000 to about 800,000 cps to produce a long-working-life prepreg composition whose handling properties, particularly viscosity, do not change significantly over at least about thirty days or more at room temperature. The latent hardener or curing agent in the matrix resin formulation is essentially or relatively unreactive at room temperature but causes rapid curing of the matrix when heated or radiated. The latent hardener or curing agent is sufficiently unreactive that the matrix resin formulation will, upon heating, allow the viscosity of the prepreg composition to decrease sufficiently to cause the resin to flow to eliminate voids during winding and formation of a wound composite article, but no so low as to cause excessive resin bleed from the composite article, i.e. generally to a viscosity of from about 500 to about 30,000 cps, to obtain good knitting between plies of the wound prepreg strands, plies of tape or plies of fabric and then cause the viscosity of the matrix material to increase by the resin gelling or setting, i.e. becoming fully cured as a cured composite article during the thermal cure sequence typically employed in filament winding of composite articles. FIG. 4 illustrates the viscosity profile of a typical chemorheologically viscosity tailored matrix resin formulation of this invention during formation, impregnation and spooling, prepreg storage at room temperature and heated composite article winding and cure.

DETAILED DESCRIPTION OF THE INVENTION

Figure 1:
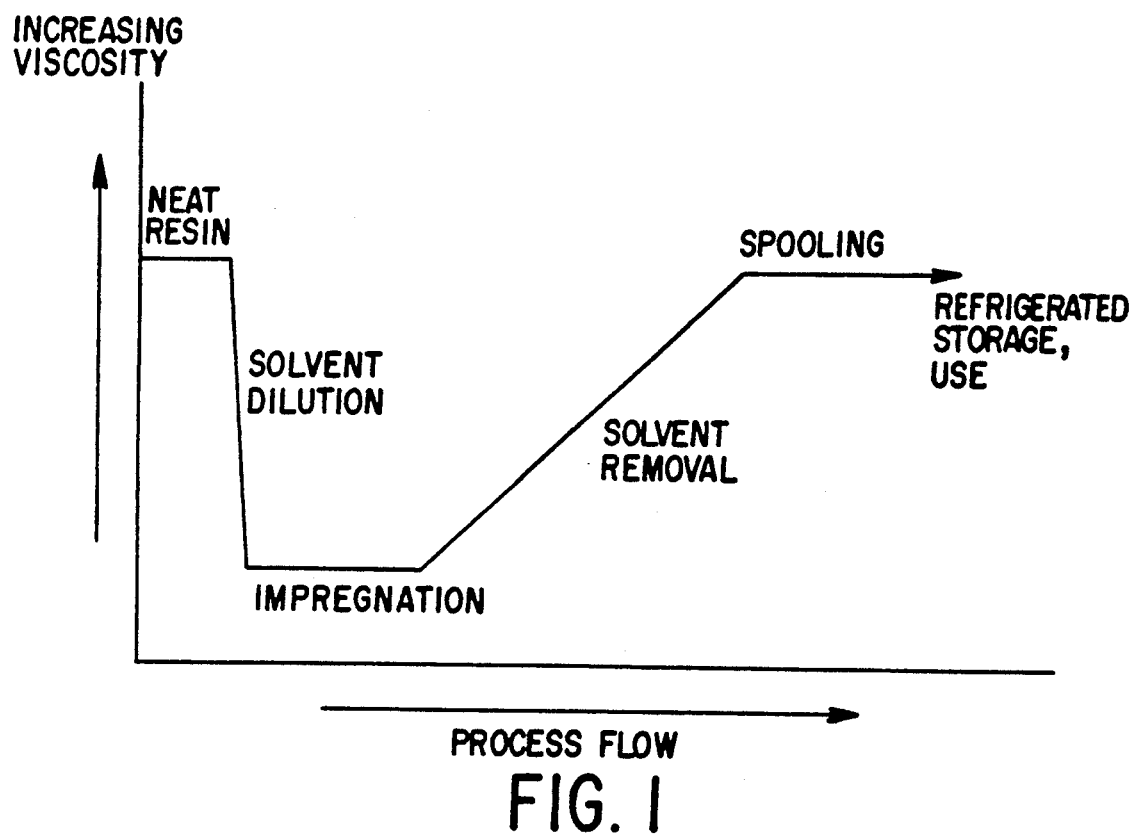
FIG. 1 is a typical viscosity profile of a matrix resin during impregnation for prepreg formation according to the aforementioned prior art solvent dilution impregnation process.
Figure 2:
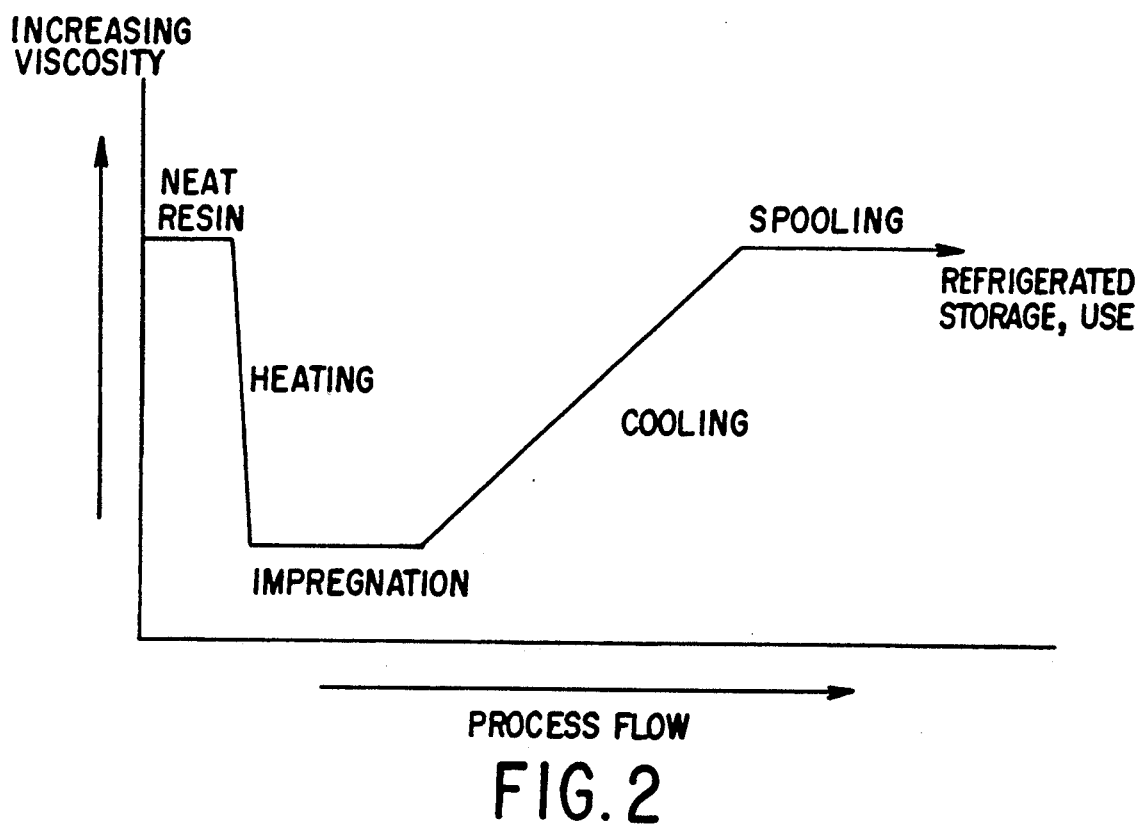
FIG. 2 is a typical viscosity profile of a matrix resin during impregnation for prepreg formation according to the aforementioned prior art hot-melt impregnation process.

The present invention provides a means to avoid the highly undesirable features previously required to prepare and store long-working-life prepreg compositions by the solution impregnation and hot-melt impregnation processes. As mentioned in the Background Of The Invention section, in the solvent dilution impregnation process, a matrix material formulation (neat resin) having a room temperature viscosity of greater than 5,000 cps is required to be diluted with a solvent to a viscosity of less than 5,000 cps, generally to a viscosity of about 1,000 cps, if possible, in order for the fiber to be impregnated with the diluted matrix resin. Thereafter, the solvent is removed by heating and evaporation before the prepreg is spooled. This prior art approach to the formulation of prepreg is illustrated in FIG. 1 where the viscosity profile is shown for the various stages of the solvent dilution process. In the previously described hot-melt impregnation process, the matrix material formulation (neat resin) with a room temperature viscosity greater then 5,000 cps is required to be heated until its viscosity is reduced to less than about 5,000 cps at which point the fiber can be impregnated with the matrix resin material at that elevated temperature to maintain the lowered viscosity level of the matrix resin. After fiber impregnation, the resulting prepreg composition must be cooled to increase the matrix resin viscosity and then the prepreg is spooled for storing. This prior art approach to prepreg formulation is illustrated in FIG. 2 where the viscosity profile is shown for the various stages of the hot-melt process.

Figure 3:
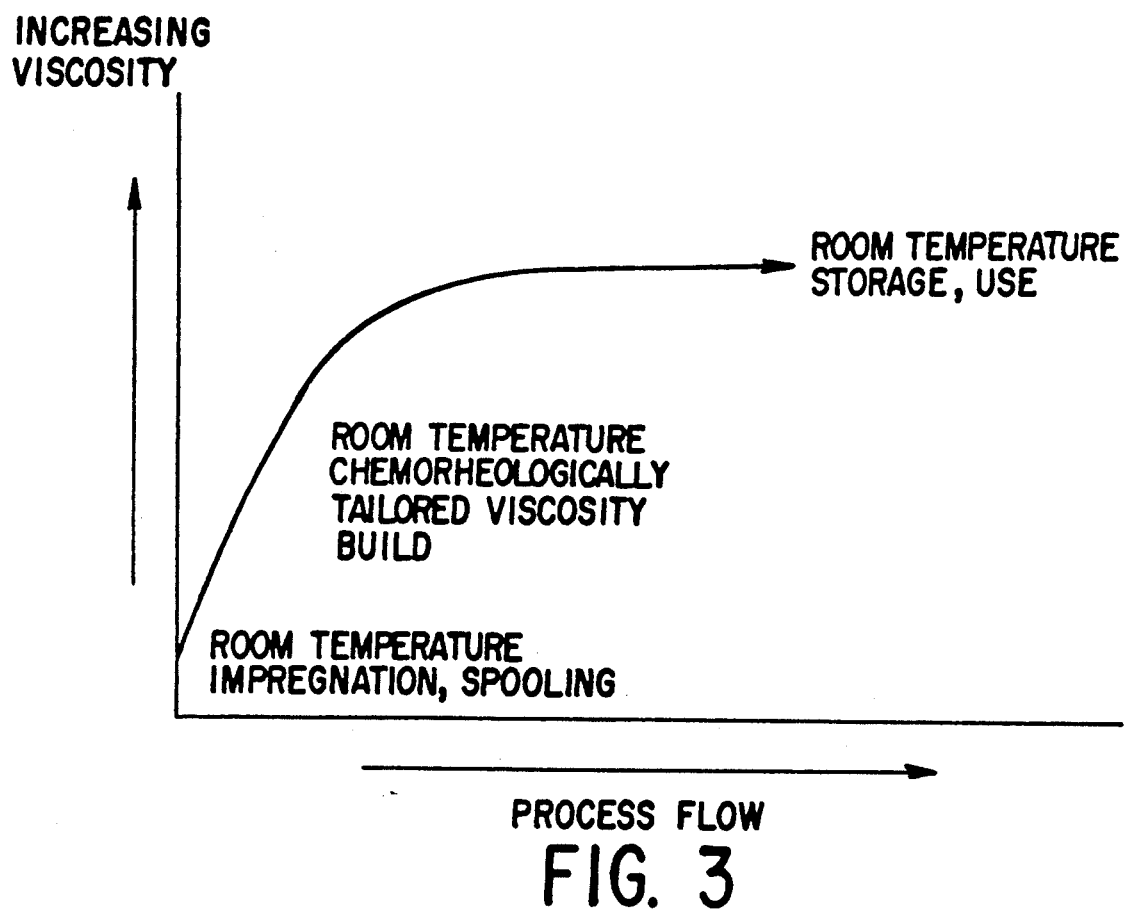
FIG. 3 is a typical viscosity profile of a matrix resin during impregnation for prepreg formation and storage thereof for a chemorheologically viscosity tailored matrix resin formulation of the present invention.

In contrast thereto, the improved process and formulations of this invention utilize matrix resin formulations having initial room temperature viscosities of less than about 5,000 cps without solvent dilution or heating thereof and which can be employed for room temperature impregnation of a fiber and spooling of the resulting prepreg composition. The matrix resin formulation of this invention, containing both a reactive and latent hardener, is mixed, the fiber impregnated with said matrix formulation, and the resulting prepreg can then be spooled substantially immediately, all at room temperature, and the matrix resin will increase in viscosity at room temperature due primarily to the action of the reactive hardener, until the viscosity plateaus at a viscosity high enough to prevent bleed of matrix resin from the prepreg due to winding tension yet low enough to allow tack and drape in the prepreg to allow it to nestle and seat during its subsequent use in winding a composite article, i.e. to a viscosity of from about 50,000 cps to about 800,000 cps. The viscosity profile obtained using a typical chemorheologically viscosity tailored matrix resin formulation according to this invention is illustrated in FIGS. 3 and 4 where the viscosity profile is shown for the various stages of the process of this invention. FIG. 3 shows the viscosity profile only for the matrix resin formulation mixing, fiber impregnation and prepreg spooling and storage stages. The profile shows that the room temperature viscosity of the resin matrix formulation is at an initial viscosity suitable for impregnation and spooling and that its viscosity then rises gradually until it plateaus out at an acceptable level for long term storage and subsequent use in winding a composite article. FIG. 3 thus illustrates primarily the action of the reactive hardener in the matrix resin formulation. FIG. 4 additionally illustrates the viscosity profile for the various stages illustrated in FIG. 3 but also the viscosity profile during use of the prepreg to form a composite article during a heated stage of the prepreg following room temperature storage of the prepreg. As seen in FIG. 4, the viscosity of the matrix resin in the prepreg is shown to initially decrease upon heating to a viscosity level to permit the resin to flow during composite winding in order to eliminate voids but not to bleed from the prepreg thereby allowing good knitting between plies of the prepreg. Continued heating of the matrix resin in the prepreg activates the curing action of the latent hardener producing ultimate cure gellation (hardening and/or cross-linking) of the matrix resin in the composite article.

For forming the chemorheologically viscosity tailored matrix resin formulations one may employ any suitable curable matrix resin, typically epoxy resins, especially those based on diglycidyl ethers of bisphenol A. As examples of suitable matrix resin there may be mentioned, for example, alicyclic diepoxide carboxylate resins such as Ciba-Geigy's CY-179 epoxy resin; diglycidyl ether-bisphenol A epoxy resins such as Dow Chemical Co.'s DER 332, DER 383 and DER 661 and Shell Chemical Co.'s EPON 826 and EPON 828; 1,4-butanediol glycidyl ether such as Celanese Chemical Co.'s Epi-Rez 5022; polyglycol diepoxide resin such as Dow Chemical Co.'s DER 732; a bisphenol F/epichlorohydrin epoxy resin such as Shell Chemical Co.'s DPL 862; an epichlorohydrin/tetraphenylol ethane epoxy resin such as Shell Chemical Co.'s EPON 1031 and mixtures thereof.

The base resin of the matrix resin formulation will have incorporated therein a reactive curing agent and a latent curing agent as defined hereinbefore. A single reactive curing agent or a mixture of reactive curing agents may be employed. Similarly, a single latent curing agent or a mixture of latent curing agents may be employed. The curing agents are employed in amounts effective to cure the matrix resin in the desired manner as indicated hereinbefore, i.e. an amount of reactive curing agent to provide a matrix resin formulation with a room temperature viscosity of less than about 5,000 cps and which cures the prepreg at room temperature to a viscosity plateau of at least about 50,000 cps, and an amount of latent curing agent to effectively permit the matrix resin in the prepreg composition to initially decrease to a viscosity of about 500 to about 30,000 cps upon heating for winding a filament wound composite article and thereafter to completely cure the matrix resin in the composite article. Generally, the curing agents will be present in the matrix resin formulation in an amount of from about 1% to about 12% by weight based on the weight of the base resin present in the matrix resin formulation when the latent curing agent is catalytic (such as a blocked Lewis acid). When other latent curing agents are used, the amount present will be up to 40% by weight.

Any suitable active hardener for the matrix resin may be employed to produce the viscosity profile desired. As examples of reactive hardeners or curing agents, there may be mentioned, for example, aliphatic and aromatic amines such as 4-chloroaniline, 4-ethylaniline, ethyl-4-aminobenzoate, 2-ethylaniline, p-phenetidine, 1,2-diaminocyclohexane, 2,4-bis(4-aminobenzyl) aniline, bis(4-aminophenoxyphenyl) sulfone, diethyl toluenediamine, 4,4'-methylene bis(cyclohexylamine), methylene bis(2,6-diisopropylaniline), ortho-toluidine, p-anisidine and a 60/40% ratio of 4,4'-diaminodiphenylmethane and meta-phenylenediamine, and the like and mixtures thereof. When employing less active amines such as diethyl toluenediamine, methylene bis(2,6-diisopropylaniline) and the like as the active hardener a catalyst, such as for example, salicylic acid, is also employed to reduce the time to reach the desired plateau viscosity. As examples of latent hardeners or curing agents, there may be mentioned, for example, blocked Lewis acids such as boron trifluoride complexes, boron trichloride complexes, specifically boron trifluoride monoethylamine, or less reactive amines such as 4,4'-sulfonyldianiline, diaminopyridine, diethyl toluenediamine and methylene bis(2,6-diisopropylaniline) may be employed without catalysts, or latent amines such as dicyandiamide, or ureas such as 2,4-toluene-1,1'-bis(3,3 dimethyl urea) and the like and mixtures thereof.

Once the matrix resin formulations are produced, they may be employed to produce prepreg compositions of this invention by being employed to impregnate fibers or filaments. A wide variety of fibers or filaments are known in the filament winding art and may be used in this invention. These fibers and filaments include, but are not limited to, glass fibers, boron filaments, boron nitride, silicon carbide, graphite (carbon) filaments and high modulus organic filaments, particularly organic filaments of the polyethylene and aramid type. Examples of high modulus organic filaments include, but are not limited to, poly (benzothiazoles) and poly (aromatic amides) which are commonly referred to simply as "aramids". Aramids include poly (benzamides) and family of materials sold by E. I. DuPont under the trademark KEVLAR. KEVLAR 49 is an aramid fiber with improved fiber stress performance in pressure vessels and generally allows a lower weight fraction of resin to be used compared to other fibers. As an example of carbon filaments useful in this invention, there may be mentioned, for example, Amoco Performance Product's T-40 and Toray's T-800H carbon fibers.

Once a prepreg has been produced from the chemorheologically viscosity tailored matrix resin formulations of this invention, filament wound composites can be made by filament winding techniques known in the art. The ultimate cure cycle employed for curing of the composite article will depend upon the particular latent curing agents in the resin system. Generally, a multi-hour cure at elevated temperature is used. Typically, a 5-30 hour cure cycle at temperatures gradually increasing from room temperature to about 150° C. or higher is employed. Faster acting catalysts and/or initiators can be used to shorten the cure cycle, but may also result in an undesirably short pot life.

Six exemplary chemorheologically viscosity tailored matrix resin formulations of this invention are set forth in the following Table 1.

ture viscosity of from about 300 to about 1,000 cps and that the viscosity rises rapidly over the first several days due to the action of the reactive curing agent and then plateaus out at a viscosity of from about $10^5$ to about $10^6$ cps and maintains the viscosity substantially unchanged for a period of 40 days or more. These FIGS. 5 and 6 do not show the viscosity minimum which occurs during the heating of the prepreg for curing a composite article, nor the ultimate gellation, cure or hardening of the matrix resin in a composite article due to the action of the latent hardener or curing agent. The viscosity profile for this stage of use of a typical matrix resin formulation to form a composite article is shown in FIG. 4.

As indicated previously, prepreg can be prepared from the chemorheologically tailored matrix resin formulations of this invention and fibers or filaments. Fiber impregnation can be done by any one of a number of standard procedures for room temperature impregnation of dry fibers with neat matrix resins including but not limited to: dip tanks, funnel print blocks, hand painting, and immersion. Features important to prepreg quality are that the resin penetrates the fiber bundles to wet the individual filaments, and that an amount of resin equal to the desired resin content of the final product prepreg be applied to the fiber. The low initial viscosity of chemorheologically tailored resins simplifies this procedure. Examples of prepreg prepared from the hereinbefore described matrix resin formulations of Table 1 are set forth hereinafter in Table 2.

TABLE 2

| Resins Formulation of Table 1 | Carbon Fiber | Impregnation Technique | Resin Content (Wt. %) | Bandwidth (In) |
|---|---|---|---|---|
| B | T-40 | Paintbrush | — | 0.1 |
| B | T-40 | Dip Tank | 24.5 | 0.1 |
| D | T-40 | Dip Tank | 37.3 | 0.10–0.11 |
| F | T-40 | Dip Tank | 28.9 | 0.12–0.14 |

TABLE 1

| Component | Composition % By Weight | | | | | |
|---|---|---|---|---|---|---|
| | A | B | C | D | E | F |
| Diglycidyl ether of bisphenol A - Dow DER 383 | 72.76 | 71.39 | — | 60.16 | 60.08 | 83.01 |
| 1,4-Butanediol diglycidyl ether - Celanese Epi-Rez 5022 | 21.59 | 17.85 | — | — | — | — |
| Polyglycol diepoxide - Dow Chemical Co. DER 732 | — | — | 22.76 | 30.08 | 30.04 | 8.30 |
| Diglycidyl ether of bisphenol A - Shell Epon 828 | — | — | 68.27 | — | — | — |
| Meta-phenylene diamine | 3.72 | — | — | — | — | — |
| 4-Ethylaniline | — | 7.82 | 6.52 | 7.38 | — | 5.79 |
| P-Anisidine | — | — | — | — | 7.49 | — |
| Boron trifluoride monoethylamine | 1.86 | 2.94 | 2.45 | 2.39 | 2.39 | 2.70 |
| Salicylic acid catalyst | 0.07 | — | — | — | — | — |
| Neopentyl(dialkyl)oxy di(p-amino) benzoate zirconate - Kenrich LZ-37 coupling agent | — | — | — | — | — | 0.20 |

Figure 5:
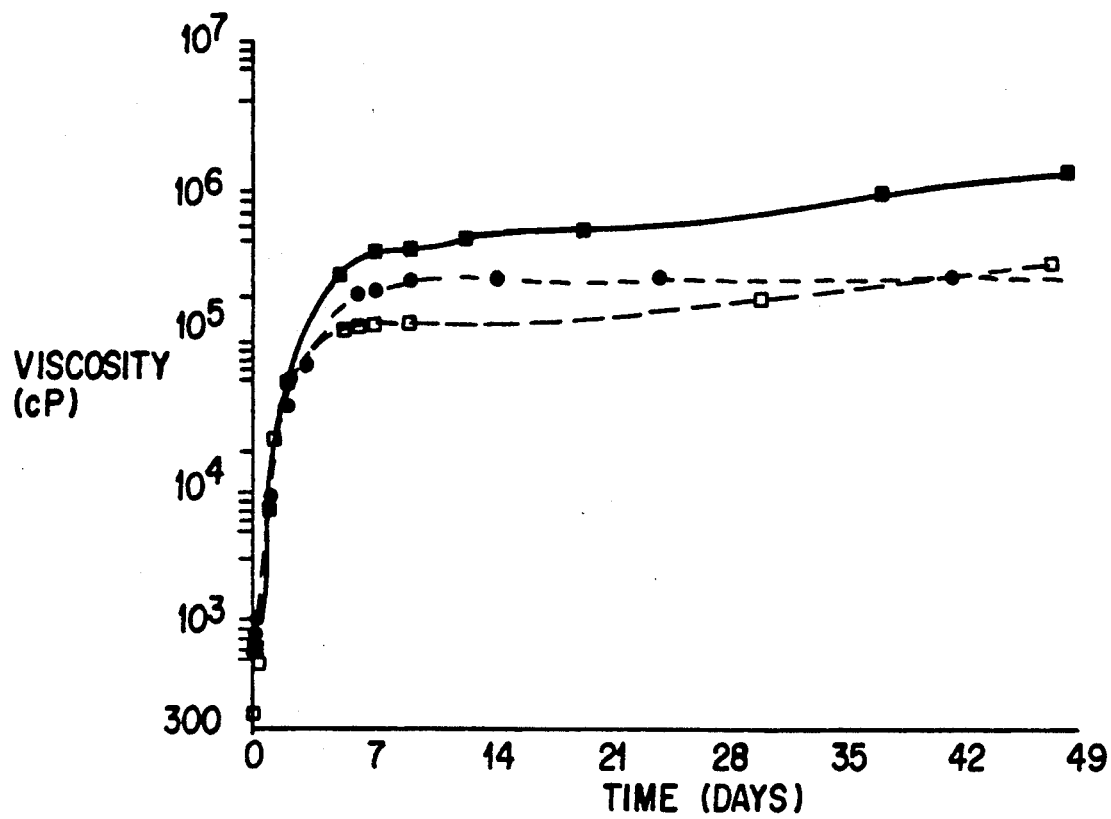
FIGS. 5 and 6 are room temperature viscosity profiles of several chemorheologically tailored matrix resin formulation of this invention during prepreg formation and storage.
Figure 6:
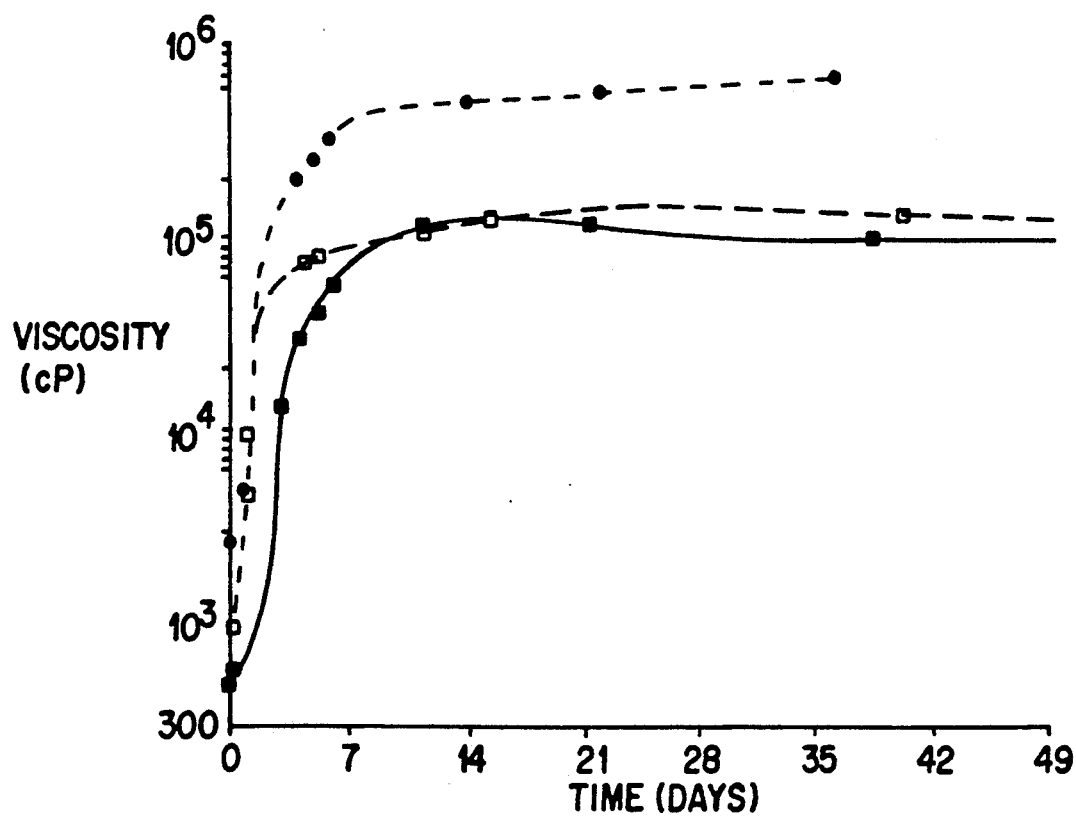

The room temperature (70° F.) viscosity profile of these six chemorheologically tailored matrix resin formulations when employed to impregnate graphite filaments at room temperature is shown in FIGS. 5 and 6. The viscosity profile of the compositions is shown on the Figures by the following symbols:
Composition A—FIG. 5, black square
Composition B—FIG. 5, white square
Composition C—FIG. 5, black circle
Composition D—FIG. 6, black square
Composition E—FIG. 6, white square
Composition F—FIG. 6, black circle.
In each instance it is seen that the chemorheologically tailored matrix formulation has an initial room tempera-

| F | T-800H | Dip Tank | 29–33 | 0.12–0.14 |

Prepregs containing the impregnated fibers are spooled for storage and use. Important features are: that the operation must result in a firm well proportioned spool, that the spool and each fiber tow have the proper resin content, and that each tow have the proper bandwidth. The low viscosity of the chemorheologically tailored resin at this stage lubricates the tow, permitting manipulation of the bandwidth.

A short storage period is necessary to finalize the fabrication of the prepreg. During the room temperature storage the viscosity of the matrix resin rises to the plateau predetermined by the chemistry of the chemorheologically tailored resin. Room temperature resin migration in the prepreg is eliminated as the resin stiffens. As the room temperature viscosity rises, the cure minimum viscosity also rises, enough to minimize resin migration during cure. Bandwidth becomes stable. The long-working-life prepregs produced by this produce can be stored, shipped and used without refrigeration with insignificant changes in material processing properties.

In order to test the effectiveness of a resin for filament winding, certain standard structures can be fabricated. They include NOL (Naval Ordinance Lab) rings, cylinders and pressure vessels (bottles), the latter being considered the best indication of resin effects.

The process of fabricating composites from prepregs prepared from chemorheologically tailored resins has been accomplished. The prepregs T-40/Composition B and T-40/Composition F in the form of unidirectional 12,000 filament tow have been filament wound into 7.5 inch long, 5.75 inch diameter pressure vessels. Heat cure of the chemorheologically tailored resin transformed it from a liquid with a high but stable viscosity into a rigid polymeric glass. Such composite articles fabricated from prepregs prepared from chemorheologically viscosity tailored resins of this invention have similar properties to composite articles prepared in other ways. Table 3 below compares burst pressures of pressure vessels fabricated from prepregs from chemorheologically tailored resins with similar pressure vessels fabricated from other materials and by a wet winding process.

TABLE 3

| Material | Fabrication Technique | Translation* % |
|---|---|---|
| T-40 Graphite Fiber diglycidyl ether-bisphenol A resin | Wet-Winding | 85.2 |
| T-40 Graphite Fiber Composition B tailored resin | Wet-Winding | 71.4 |
| T-40 Graphite Fiber Composition B Prepreg from tailored resin | Prepreg Winding | 73.7 |
| T-40 Graphite Fiber Composition F Prepreg from tailored resin | Prepreg Winding | 87.4 |

*Translation in percentage of tow tensile tests results.

As additional examples of chemorheologically viscosity tailored matrix resin formulation of this invention, there may be mentioned the following illustrative compositions.

| Components | Composition Parts By Weight | | | | | | |
|---|---|---|---|---|---|---|---|
| | G | H | I | J | K | L | M |
| Diglycidyl ether of bisphenol A - Dow DER 383 | 138.01 | 130.0 | 130.0 | 120.0 | 125.0 | 115.0 | |
| 1,4-Butanediol diglycidyl ether | 38.57 | 38.57 | 38.57 | 35.6 | 37.09 | 34.12 | 37.64 |
| Ethyl-4-aminobenzoate | | | | | | | 34.39 |
| 4-Chloroaniline | | | | | | 27.77 | |
| 4-Ethylaniline | | | | | 11.47 | | |
| Bis(4-aminophenoxy-phenyl) sulfone | | | | 39.24 | | | |
| Meta-phenylene diamine | 5.31 | 5.31 | 5.31 | | | 4.7 | 4.5 |
| 4,4-Sulfonyl dianiline | 18.30 | — | | | | | |
| Diethyl toluenediamine | 13.16 | 13.16 | 13.16 | 12.15 | 12.66 | | |
| Ortho-toluidine | | | 6.74 | | | | |
| Boron trifluoride monoethylamine | 1.69 | 4.21 | | 3.9 | 4.06 | 1.48 | 1.41 |

The chemorheologically viscosity tailored matrix resin formulations of this invention may also have present in the formulations other optional ingredients such as surfactants, coupling agents, flow control agents and the like which do not adversely affect the viscosity profile of the formulations.

The foregoing examples illustrate the matrix resin formulations, prepreg compositions and composite articles of this invention and the process for producing same. It will be apparent to those skilled in the art that the foregoing description is merely illustrative of the invention and that the invention has numerous embodiments not specifically exemplified.

We claim:

1. A chemorheologically viscosity tailored matrix resin formulation for use in forming prepregs and filament wound composite articles and having a specified viscosity profile comprising a curable epoxy matrix resin and an effective amount of a reactive resin curing agent reactive at room temperature and a latent resin curing agent substantially non-reactive at room temperature but activated upon heating or radiation such that the matrix resin formulation is adapted upon formulation to have a viscosity sufficiently low enough to enable the matrix resin to impregnate a filament or fiber at room temperature without the necessity for the application of heat or solvent and which, upon standing at room temperature after impregnation into the fiber or filament to form a prepreg composition, rises in viscosity to a viscosity level sufficiently high to prevent excessive bleed of the matrix resin from winding tension upon spooling of the prepreg yet of sufficiently low enough viscosity to allow the prepreg to tack and drape in order to nestle and set during winding of a filament wound composite article from said prepreg after room temperature storage of the spooled prepreg material, and which matrix resin in the prepreg experiences a reduction in viscosity upon heating the prepreg composition, to a viscosity minimum sufficient low to allow the matrix resin in the heated prepreg to flow and substantially eliminate the formation of voids in the winding of a composite article from said prepreg yet not so low as to permit bleeding of the matrix resin from the prepreg and with the continued application of heat to the filament wound composite article to permit the matrix resin in the filament wound composite article to cure to a hardened or gelled state.

2. A chemorheologically viscosity tailored matrix resin formulation of claim 1 wherein the matrix resin formulation has an initial viscosity of less than about 5,000 cps upon formulation, after impregnating a fiber or filament to form a prepreg composition and standing at room temperature reaches a viscosity plateau of from about 50,000 cps to about 800,000 cps, and upon heating first reaches a viscosity minimum of from about 500 cps to about 30,000 cps for filament winding of a composite article and with continued application of heat thereto results in the matrix resin in the composite article curing to a hardened or gelled state.

3. A chemorheologically viscosity tailored matrix resin formulation of claim 1 wherein the latent resin curing agent is selected from the group consisting of aliphatic and aromatic amine epoxy resin curing agents.

4. A chemorheologically viscosity tailored matrix resin formulation of claim 2 wherein the latent resin curing agent is selected from the group consisting of aliphatic and aromatic amine epoxy resin curing agents.

5. A chemorheologically viscosity tailored resin of claim 3 wherein the latent curing agent is selected from the group consisting of a boron trifluoride complex, a boron trichloride complex, 4,4'-sulfonyldianiline, diaminopyridine, diethyl toluenediamine, methylene bis(2,6-diisopropylaniline), dicyandiamide and 2,4-toluene-1,1'-bis(3,3 dimethylurea).

6. A chemorheologically viscosity tailored resin of claim 4 wherein the latent curing agent is selected from the group consisting of a boron trifluoride complex, a boron trichloride complex, 4,4'-sulfonyldianiline, diaminopyridine, diethyl toluenediamine, methylene bis(2,6-diisopropylaniline), dicyandiamide and 2,4-toluene-1,1'-bis(3,3 dimethylurea).

7. A chemorheologically viscosity tailored matrix resin formulation of claim 3 wherein the latent curing agent is a blocked Lewis acid epoxy curing agent.

8. A chemorheologically viscosity tailored matrix resin formulation of claim 4 wherein the latent curing agent is a blocked Lewis acid epoxy curing agent.

9. A chemorheologically viscosity tailored matrix resin formulation of claim 7 wherein the curing agents are present in an amount of from about 1% to about 12% by weight based on the weight of curable matrix resin.

10. A chemorheologically viscosity tailored matrix resin formulation of claim 8 wherein the curing agents are present in an amount of from about 1% to about 12% by weight based on the weight of curable matrix resin.

11. A chemorheologically viscosity tailored matrix resin of claim 9 wherein the curable matrix resin comprises a diglycidyl ether of bisphenol A and 1,4-butanediol diglycidyl ether and the latent curing agent comprises boron trifluoride monoethylamine and the reactive curing agent comprises at least one member selected from the group consisting of methylene bis(2,6-diisopropylaniline), 4-ethylaniline, diethyl toluenediamine, ortho-toluidine, 2-ethylaniline, p-phenetidine, 1,2-diaminocyclohexane, 2,4-bis(4-aminobenzyl) aniline, 4,4'-methylene bis(cyclohexylamine), 4,4'-diamino diphenylmethane, meta-phenylene diamine, 4-chloroaniline, p-anisidine, ethyl-4-toluidine and bis(4-aminophenoxyphenyl) sulfone.

12. A chemorheologically viscosity tailored matrix resin of claim 10 wherein the curable matrix resin comprises a diglycidyl ether of bisphenol A and 1,4-butanediol diglycidyl ether and the latent curing agent comprises boron trifluoride monoethylamine and the reactive curing agent comprises at least one member selected from the group consisting of methylene bis(2,6-diisopropylaniline), 4-ethylaniline, diethyl toluenediamine, ortho-toluidine, 2-ethylaniline, p-phenetidine, 1,2-diaminocyclohexane, 2,4-bis(4-aminobenzyl) aniline, 4,4'-methylene bis(cyclohexylamine), 4,4'-diamino diphenylmethane, meta-phenylene diamine, 4-chloroaniline, p-anisidine, ethyl-4-toluidine and bis(4-aminophenoxyphenyl) sulfone.

13. An incompletely cured matrix resin-fiber prepreg composition wherein the fibers are impregnated at room temperature with a chemorheologically viscosity tailored matrix resin formulation of claim 1 and said matrix resin in the resin-fiber prepreg composition rises in viscosity at room temperature to a viscosity plateau sufficiently high to prevent excessive bleed of the matrix resin upon spooling of the prepreg yet of sufficiently low viscosity to allow the prepreg to tack and drape in order to nestle and seat during winding of a filament wound composite article from said prepreg after room temperature storage of said prepreg composition and wherein said viscosity plateau is substantially unchanged upon room storage of the prepreg composition for at least thirty days.

14. An incompletely cured matrix resin-fiber prepreg composition wherein the fibers are impregnated at room temperature with a chemorheologically viscosity tailored matrix resin formulation of claim 2 and wherein the viscosity plateau of the prepreg is substantially unchanged upon room storage of the prepreg composition for at least thirty days.

15. An incompletely cured matrix resin-fiber prepreg composition wherein the fibers are impregnated at room temperature with a chemorheologically viscosity tailored matrix resin formulation of claim 3 and wherein the viscosity plateau of the prepreg is substantially unchanged upon room storage of the prepreg composition for at least thirty days.

16. An incompletely cured matrix resin-fiber prepreg composition wherein the fibers are impregnated at room temperature with a chemorheologically viscosity tailored matrix resin formulation of claim 4 and wherein the viscosity plateau of the prepreg is substantially unchanged upon room storage of the prepreg composition for at least thirty days.

17. An incompletely cured matrix resin-fiber prepreg composition wherein the fibers are impregnated at room temperature with a chemorheologically viscosity tailored matrix resin formulation of claim 5 and wherein the viscosity plateau of the prepreg is substantially unchanged upon room storage of the prepreg composition for at least thirty days.

18. An incompletely cured matrix resin-fiber prepreg composition wherein the fibers are impregnated at room temperature with a chemorheologically viscosity tailored matrix resin formulation of claim 6 and wherein the viscosity plateau of the prepreg is substantially unchanged upon room storage of the prepreg composition for at least thirty days.

19. An incompletely cured matrix resin-fiber prepreg composition wherein the fibers are impregnated at room temperature with a chemorheologically viscosity tailored matrix resin formulation of claim 7 and wherein the viscosity plateau of the prepreg is substantially unchanged upon room storage of the prepreg composition for at least thirty days.

20. An incompletely cured matrix resin-fiber prepreg composition wherein the fibers are impregnated at room temperature with a chemorheologically viscosity tailored matrix resin formulation of claim 8 and wherein the viscosity plateau of the prepreg is substantially unchanged upon room storage of the prepreg composition for at least thirty days.

21. An incompletely cured matrix resin-fiber prepreg composition wherein the fibers are impregnated at room temperature with a chemorheologically viscosity tailored matrix resin formulation of claim 9 and wherein the viscosity plateau of the prepreg is substantially unchanged upon room storage of the prepreg composition for at least thirty days.

22. An incompletely cured matrix resin-fiber prepreg composition wherein the fibers are impregnated at room temperature with a chemorheologically viscosity tailored matrix resin formulation of claim 10 and wherein the viscosity plateau of the prepreg is substantially unchanged upon room storage of the prepreg composition for at least thirty days.

23. An incompletely cured matrix resin-fiber prepreg composition wherein the fibers are impregnated at room temperature with a chemorheologically viscosity tailored matrix resin formulation of claim 11 and wherein the viscosity plateau of the prepreg is substantially unchanged upon room storage of the prepreg composition for at least thirty days.

24. An incompletely cured matrix resin-fiber prepreg composition wherein the fibers are impregnated at room temperature with a chemorheologically viscosity tailored matrix resin formulation of claim 12 and wherein the viscosity plateau of the prepreg is substantially unchanged upon room storage of the prepreg composition for at least thirty days.

25. A cured filament wound composite comprising fibers in a chemorheologically viscosity tailored resin matrix of claim 1.

26. A cured filament wound composite comprising fibers in a chemorheologically viscosity tailored resin matrix of claim 2.

27. A cured filament wound composite comprising fibers in a chemorheologically viscosity tailored resin matrix of claim 3.

28. A cured filament wound composite comprising fibers in a chemorheologically viscosity tailored resin matrix of claim 4.

29. A cured filament wound composite comprising fibers in a chemorheologically viscosity tailored resin matrix of claim 5.

30. A cured filament wound composite comprising fibers in a chemorheologically viscosity tailored resin matrix of claim 6.

31. A cured filament wound composite comprising fibers in a chemorheologically viscosity tailored resin matrix of claim 7.

32. A cured filament wound composite comprising fibers in a chemorheologically viscosity tailored resin matrix of claim 8.

33. A cured filament wound composite comprising fibers in a chemorheologically viscosity tailored resin matrix of claim 9.

34. A cured filament wound composite comprising fibers in a chemorheologically viscosity tailored resin matrix of claim 10.

35. A cured filament wound composite comprising fibers in a chemorheologically viscosity tailored resin matrix of claim 11.

36. A cured filament wound composite comprising fibers in a chemorheologically viscosity tailored resin matrix of claim 12.

* * * * *